(12) United States Patent
Patel et al.

(10) Patent No.: US 11,227,406 B2
(45) Date of Patent: Jan. 18, 2022

(54) FUSING DEEP LEARNING AND GEOMETRIC CONSTRAINT FOR IMAGE-BASED LOCALIZATION

(71) Applicant: FUJIFILM Business Innovation Corp., Tokyo (JP)

(72) Inventors: Miteshkumar Patel, San Mateo, CA (US); Jingwei Song, Union City, CA (US); Andreas Girgensohn, Palo Alto, CA (US); Chelhwon Kim, Palo Alto, CA (US)

(73) Assignee: FUJIFILM Business Innovation Corp., Tokyo (JP)

( * ) Notice: Subject to any disclaimer, the term of this patent is extended or adjusted under 35 U.S.C. 154(b) by 47 days.

(21) Appl. No.: 16/805,152

(22) Filed: Feb. 28, 2020

(65) Prior Publication Data

US 2021/0272317 A1 Sep. 2, 2021

(51) Int. Cl.
*G06T 7/70* (2017.01)
*G06T 7/73* (2017.01)
*G06K 9/62* (2006.01)

(52) U.S. Cl.
CPC .............. *G06T 7/74* (2017.01); *G06K 9/6256* (2013.01); *G06K 9/6261* (2013.01);
(Continued)

(58) Field of Classification Search
CPC ............ G06T 7/74; G06T 2207/10068; G06T 2207/20084; G06T 2207/30061; G06T 2207/20076; G06T 2207/30108; G06T 2207/30092; G06T 2207/20081; G06K 9/6256; G06K 9/6261; G06K 9/6267; G06K 2209/05
See application file for complete search history.

(56) References Cited

U.S. PATENT DOCUMENTS 9,307,926 B2 * 4/2016 Begin .................. G06T 7/0014
9,547,940 B1 * 1/2017 Sun ........................ G06T 7/344
(Continued)

OTHER PUBLICATIONS

Turan et al. "Unsupervised Odometry and Depth Learning for Endoscopic Capsule Robots", 2018 IEEE/RSJ International Conference on Intelligent Robots and Systems (IROS) (Year: 2018).*
(Continued)

*Primary Examiner* — Qian Yang
(74) *Attorney, Agent, or Firm* — Procopio, Cory, Hargreaves & Savitch LLP (57) ABSTRACT

A computer-implemented method, comprising applying training images of an environment divided into zones to a neural network, and performing classification to label a test image based on a closest zone of the zones; extracting a feature from retrieved training images and pose information of the test image that match the closest zone; performing bundle adjustment on the extracted feature by triangulating map points for the closest zone to generate a reprojection error, and minimizing the reprojection error to determine an optimal pose of the test image; and for the optimal pose, providing an output indicative of a location or probability of a location of the test image at the optimal pose within the environment.

20 Claims, 11 Drawing Sheets
(8 of 11 Drawing Sheet(s) Filed in Color)

(52) U.S. Cl.
CPC ....... *G06K 9/6267* (2013.01); *G06K 2209/05* (2013.01); *G06T 2207/10068* (2013.01); *G06T 2207/20076* (2013.01); *G06T 2207/20081* (2013.01); *G06T 2207/20084* (2013.01); *G06T 2207/30061* (2013.01); *G06T 2207/30092* (2013.01); *G06T 2207/30108* (2013.01)

(56) References Cited

U.S. PATENT DOCUMENTS

| | | | |
|---|---|---|---|
| 10,682,108 B1* | 6/2020 | Ma | A61B 1/31 |
| 2018/0150929 A1* | 5/2018 | Pheiffer | G06T 7/30 |
| 2018/0174311 A1* | 6/2018 | Kluckner | G06K 9/6259 |
| 2020/0387706 A1* | 12/2020 | Zur | G06K 9/6271 |

OTHER PUBLICATIONS

Shen et al., "Robust camera localisation with depth reconstruction for bronchoscopic navigation", Int J CARS (2015) 10:801-813 (Year: 2015).*

Zhang et al. "Vision-Based Pose Estimation for Textureless Space Objects by Contour Points Matching", IEEE Transactions on Aerospace and Electronic Systems vol. 54, No. 5 (Year: 2018).*

Arandjelovic, R., et al., NetVLAD: CNN Architecture for Weakly Supervised Place Recognition, In Proceedings of the IEEE Conference on Computer Vision and Pattern Recognition, 2016, pp. 5297-5307.

Deguchi, D., et al., Selective Image Similarity Measure for Bronchoscope Tracking Based on Image Registration, Medical Image Analysis, 2009, 13, pp. 621-633.

Dimas, G., et al., Visual Localization of Wireless Capsule Endoscope Aided by Artificial Neural Networks, 2017 IEEE 30th International Symposium on Computer-Based Medical Systems, 2017, pp. 734-738.

Engel, J., et al., Direct Sparse Odometry, IEEE Transactions on Pattern Analysis and Machine Intelligence, 40(3), Mar. 2018, pp. 611-625.

He, K., et al., Deep Residual Learning for Image Recognition, Proceedings of the IEEE Conference on Computer Vision and Pattern Recognition, 2016, pp. 770-778.

Kendall, A.., et al., PoseNet: A Convolutional Network for Real-Time 6-DOF Camera Relocalization, Proceedings of the IEEE International Conference on Computer Vision, 2015, pp. 2938-2946.

Luo, X., et al., Development and Comparison of New Hybrid Motion Tracking for Bronchoscopic Navigation, Medical Image Analysis, 2012, 16, pp. 577-596.

Luo, X., et al., A Discriminative Structural Similarity Measure and its Application to Video-Volume Registration for Endoscope Three-Dimensional Motion Tracking, IEEE Transactions on Medical Imaging 33(6), Jun. 2014, pp. 1248-1261.

Mahmoud, N., et al, ORBSLAM-based Endoscope Tracking and 3D Reconstruction, arXiv:1608.08149 [cs.CV], Aug. 29, 2016, 13 pgs.

Merritt, S. A., et al., Interactive CT-Video Registration for the Continuous Guidance of Bronchoscopy, IEEE Trans Med Imaging Aug. 2013, 32(8), pp. 1376-1396.

Deguchi, D., et al., New Image Similarity Measure for Bronchoscope Tracking Based on Image Registration, Medical Imaging 2004: Physiology, Function, and Structure from Medical Images, 5369, 2004, pp. 165-176.

Mur-Artal, R., et al., ORB-SLAM2: an Open-Source SLAM System for Monocular, Stereo and RGB-D Cameras, IEEE Transactions on Robotics, Jul. 19, 2017, 33(5), pp. 1255-1262.

Patel, M., et al., ContextualNet: Exploiting Contextual Information Using LSTMs to Improve Image-Based Localization, 2018 IEEE International Conference on Robotics and Automation (ICRA), May 21-25, 2018, Brisbane, Australia, pp. 5890-5896.

Sganga, J., et al., OffsetNet: Deep Learning for Localization in the Lung Using Rendered Images, arXiv:1809.05645 [cs.CV], Sep. 15, 2018, 7 pgs.

Shen, M., et al., Robust Camera Localisation with Depth Reconstruction for Bronchoscopic Navigation, International Journal of Computer Assisted Radiology and Surgery, 10(6), 2015, 16 pgs.

Turan, M., et al., Deep EndoVO: A Recurrent Convolutional Neural Network (RCNN) Based Visual Odometry Approach for Endoscopic Capsule Robots, Neurocomputing, 275, 2018, pp. 1861-1870.

Weyand, T., et al., PlaNet—Photo Geolocation with Convolutional Neural Networks, European Conference on Computer Vision, Feb. 17, 2016, 10 pgs.

* cited by examiner

Figure 11 ly in the medical field, where a determination that a scope is completely outside of an environment, such as the lungs or a GI tract, can make it difficult for a medical professional to rely on the information and make an appropriate analysis and treatment.

FUSING DEEP LEARNING AND GEOMETRIC CONSTRAINT FOR IMAGE-BASED LOCALIZATION

BACKGROUND

Field

Aspects of the example implementations relate to methods, systems and user experiences associated with image-based localization in an environment, and more specifically, an approach that fuses deep learning and geometric constraints for image-based localization.

Related Art

Related art endoscopic systems may provide a minimal invasive way to examine internal body structures. More specifically, related art Minimally Invasive Surgery (MIS) approaches may provide medical practitioners with tools to examine the internal body structure, and can be used for accurate therapeutic interventions.

For example, a scope, such as an endoscope or a bronchoscope, may be placed into an environment of a patient, such as the intestines or lungs, to examine the structure thereof. A device on the scope, such as a sensor or camera, may sense information, and provide the information to a user, such as images, a video or the like of an environment. A medical professional, such as a surgeon, may analyze the video. Based on the analysis, the surgeon may provide a recommendation or perform an action.

With related art robotic and sensor technology, various related art gastrointestinal (GI) tract scope solutions have been developed. For such related art GI tract approaches, accurate localization and tracking can permit medical practitioners to locate and track the progression of various pathological findings such as polyps, cancerous tissues, lesion etc. Such related art endoscopic systems may cover needs for accurate therapeutic interventions, and must thus be able to accurately localize and track in a given gastrointestinal (GI) tract and/or bronche tract.

Related art approaches to tracking of the GI tract may include image similarity comparison, such as use of related art image descriptors to compare the image similarity, also referred to as image classification. Further, the related art may use geometry based pose regression, such as related art geometric techniques such SLAM or shape-from-shading for image to model registration, also referred to as geometric optimization. The related art may also use deep learning based image to pose regression.

The related art deep learning approach has various problems and disadvantages that are unique to tracking for applications such as colonoscopy or bronchoscopy, such as a small annotated training dataset, and lack of an identifiable texture, which is different from other indoor or outdoor environments in which deep learning has been used in the related art. For example, there are no corner points to define texture, and the nature of the body tissue is that it has blood flow and smooth curves and tube structures, without corner points. Accordingly, there is a volumetric surface similar corners, and a mixture of solids and liquids.

For example, but not by way of limitation, the related art deep learning and regression approaches suffer from the problem with having insufficient data sets, as well as lack of corners and texture as explained above; in these aspects, the surgical scenario is different and distinguishable from related art approaches that are used in other environments, such as automated driving and the like. For example, because of the unique physiological properties of the GI tract in the lungs, there are many tube-like structures that do not have corners.

Additionally, because the related art approaches to deep learning and regression attempt to find a position of the scope, additional problems and/or disadvantages may occur. For example but not by way of limitation, there is another problem associated with outliers that are located completely outside of the environment, due to the lack of sufficient quality and quantity of data sets for training. A consequence of such outliers is quite significant in the medical field, where a determination that a scope is completely outside of an environment, such as the lungs or a GI tract, can make it difficult for a medical professional to rely on the information and make an appropriate analysis and treatment.

Related approaches to localization in the GI tract use monocular images, with related art computer vision techniques (e.g., SIFT and SURF). However, such related art approaches may have various problems and disadvantages, such as deformation, intensity and different obstructions. For example, the related art systems may have lack of depth perception, or poor localization within the limited field of view provided by the related art RGB/monocular images. For example, due to proximity of soft tissue in the environment of the patient's body, the scope has a small field of view.

Related art depth/stereo based scope positioning systems cannot be directly adapted to monocular endoscopes, as 3D depth information is not provided, and the only available data is the RGB video.

Further, there is an unmet need to use a large amount of data to generalize deep learning-based localization and tracking. Such data is hard to acquire, especially for the medical domain due to privacy issues. Further, the related art geometry based methods are not applicable for GI-track scope tracking, as the number of features are minimal and registration may be lost. It is also not practical or healthy to increase the number of data sets by continuing to aggressively insert a scope into a patient.

Thus, a practitioner may find it difficult to determine a location of a scope in an environment of the human body, such as an endoscope location the GI tract. This issue becomes even more acute in certain tissues, such as the lungs, because of the branching physiology of the lungs.

SUMMARY

According to an aspect of the example implementations, a computer-implemented method is provided, comprising applying training images of an environment divided into zones to a neural network, and performing classification to label a test image based on a closest zone of the zones; extracting a feature from retrieved training images and pose information of the test image that match the closest zone; performing bundle adjustment on the extracted feature by triangulating map points for the closest zone to generate a reprojection error, and minimizing the reprojection error to determine an optimal pose of the test image; and for the optimal pose, providing an output indicative of a location or probability of a location of the test image at the optimal pose within the environment.

Example implementations may also include a non-transitory computer readable medium having a storage and processor, the processor capable of executing instructions for image-based localization in a target tissue, that fuses deep learning and geometric constraints for image-based localization.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

The following detailed description provides further details of the figures and example implementations of the present application. Reference numerals and descriptions of redundant elements between figures are omitted for clarity. Terms used throughout the description are provided as examples and are not intended to be limiting.

Aspects of the example implementations are directed to combining deep learning method with geometric constraints, for application in various fields, including but not limited to, minimally invasive surgery (MIS) approaches (e.g., endoscopic approaches).

In contrast to open surgery, MIS narrows the surgical field of view. Thus, a surgeon may receive less information that in open surgery approaches. Accordingly, MIS approaches require to perform operational procedures in narrow spaces using elongated tools, without direct 3D vision. Further, the training dataset may be small and limited.

The example implementations are directed to providing image-based localization for MIS techniques, with a tissue (e.g., GI tract, lungs, etc.) by constraining the localization within the tissue.

More specifically, the example implementations classify the testing image to one of the training images based on similarity. The closest training image and its neighboring images along with its pose information is used to generate optimal pose (e.g., position and orientation) of the test image using feature registration and bundle adjustment. By localizing the position and orientation of the scope, a surgeon can be aware of the location of the scope in the body. While the present example implementations refer to a scope, the example implementations are not limited to, and other MIS structures, devices, systems and/or methods may be substituted therefor without departing from the inventive scope. For example, but not by way of limitation, a probe may be substituted for a scope.

For example, but not by way of limitation, the example implementations are directed to a hybrid system that fuses deep learning with traditional geometry-based techniques. Using this fusion approach, the system can be trained using a smaller dataset. Accordingly, the example implementations may optionally provide a solution for localization using monocular RGB images, with fewer samples of training data and textures.

Further, the example implementations use geometric methods with deep learning techniques that may provide robustness of the estimated pose. More specifically, during the re-projection error minimization process, a pose with a large re-projection error may be directly rejected.

Training images may be obtained and labeled, so as to assign at least one image to each zone. The labeled images are used to train a neural network. Once the neural network has been trained, a test images provided and classified into a zone. Further, the training data set tree, and images from the training data set are obtained. The key features are obtained and adjusted, to recover points of interest, and minimize any projection errors.

The above-noted example implementations are directed to the hybrid system that fuses deep learning with geometry based localization and tracking. More specifically, the deep learning component according to the example implementations provide high level zone classification, which may be used by the geometry based refinement to optimize a pose of a given test image.

The application of geometry to perform refinement in the example implementation may assist in constraining the prediction of the deep learning model and may optionally better pose estimates. Further, by fusing deep learning and geometric techniques as described herein, a small training data sets may be used to achieve accurate results, and the related art problems, such as outliers and the like, may be avoided.

The present example implementations provide for a simulated data set that provides ground truth. In a training aspect, images are input to a neural network, and an output is provided as an image label associated with a zone of the environment. More specifically, the environment is segmented into zones. This segmentation may be performed automatically, such as dividing the zones into equal length, or may be performed by use of expert knowledge in the medical field, such as based on input of surgeons as to the appropriate segmentation of the zones. Accordingly, each image will be labeled for zone, and the images are classified to zones.

After the training phase, a test image is input and classified into a zone. The test image is fed into a neural network and compared to the training data set, to extract corners from the training images and test images, so as to build a global position of a map point. In other words, a comparison is made to the training data set, and key features are obtained and determined, and identified as corner points.

For the training image, the 3-D point is projected to the 2-D image, and an operation is performed to minimize a distance between the projected 3-D point and the 2-D image. Thus, the corner points are recovered in a manner that minimizes reprojection error.

Figure 1:
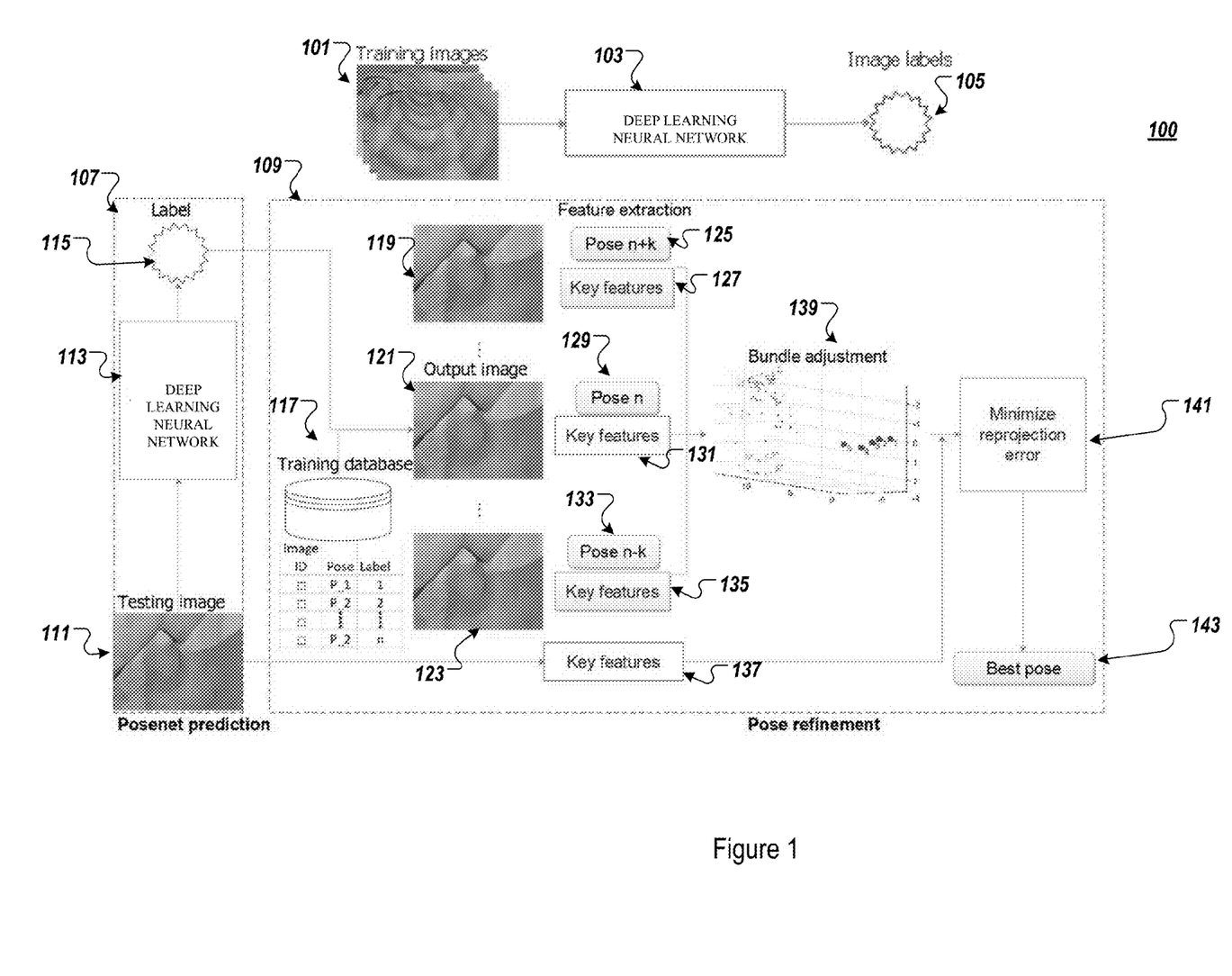
FIG. 1 illustrates various aspects of a framework for training and testing according to an example implementation.

FIGS. 1-5 illustrate various aspects of the example implementations. FIG. 1 illustrates an overall view of the example implementations, including training and inference.

The example implementations can be divided into two main blocks, PoseNet 107 (e.g., prediction), and pose refinement 109. In the prediction phase at 107, the example implementations utilize a PoseNet, which is a deep learning framework (e.g., GoogLeNet). The system consists of a prescribed number (e.g., 23) of convolutional layers and one or more fully connected layers (e.g., 1). At 107, the model learns the zone level classification, rather than learning the actual pose. During inference, the PoseNet may classify closest zone to which a given test image has a match.

In the refinement phase at 109, the zone as classified by PoseNet at 107, and the retrieved image and pose information from the training images, are applied to determine the closest match. For pose optimization, a stream of neighboring poses are employed, to the closest matched training image. That stream of images and its corresponding pose information is used for estimation of the pose.

More specifically, according to one example implementation, Unity3D may be used to generate image—pose pairs from a phantom. The posenet model 101 is trained using these training sets from 101. For example, but not by way of limitation, pose regression may be substituted with zone classification. Accordingly, images in neighboring poses are classified as zones, and labeling is performed at 105.

Figure 2:
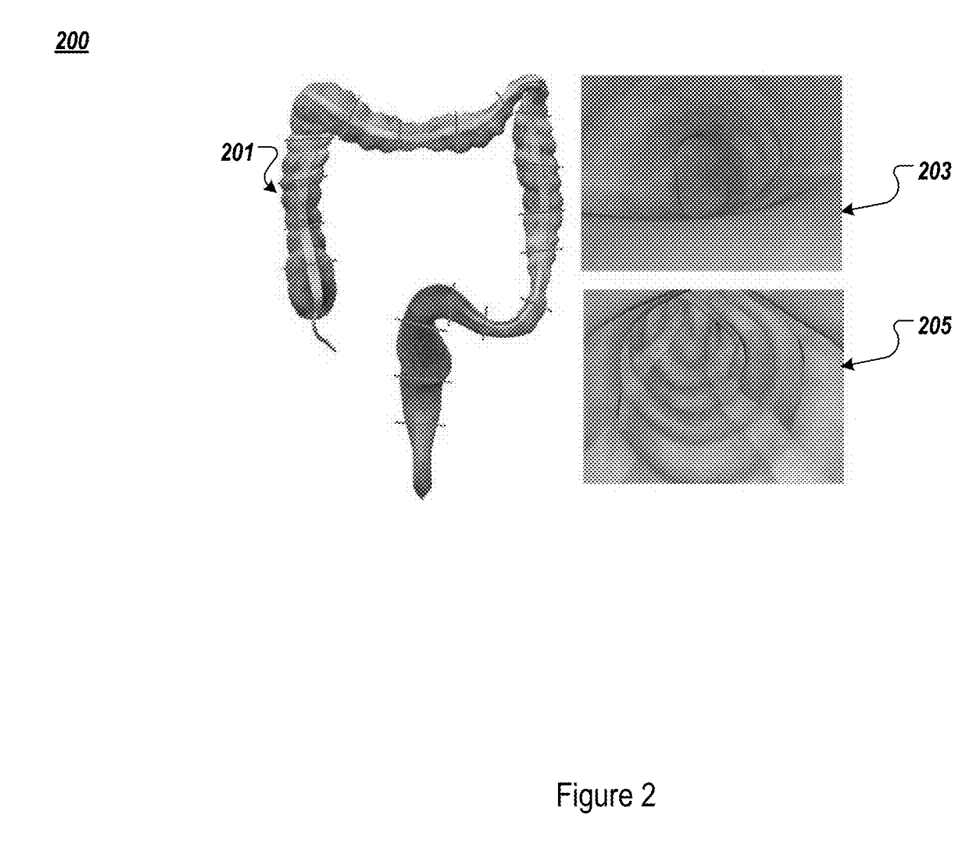
FIG. 2 illustrates example representations and data generated by a simulator according to the example implementation.

With respect to the training data, at 101, training images are provided to the deep learning neural network 103. As shown in FIG. 2, at 200, the large intestine 201 may be divided into a plurality of zones identified by lines that transact the image of the large intestine 201. For example, but not by way of limitation, a first image 203 may be representative of a first one of the zones, and a second image 205 may be representative of a second one of the zones.

Figure 3:
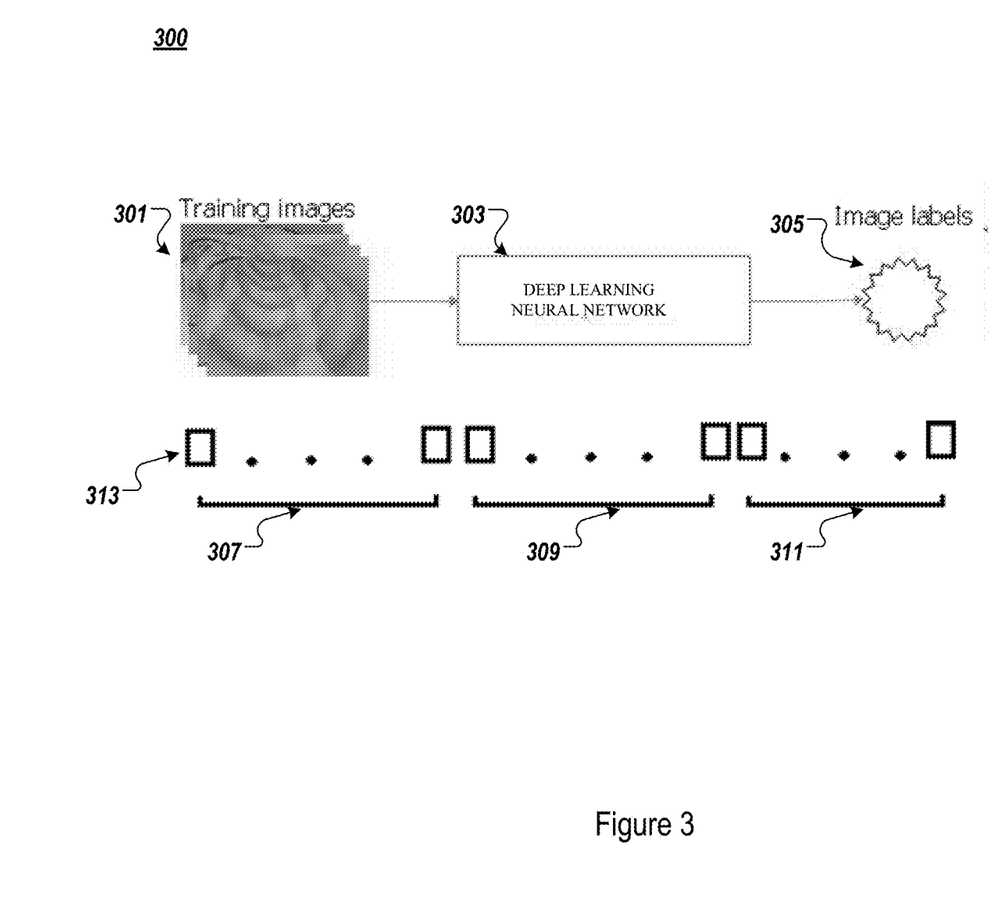
FIG. 3 illustrates a training process according to an example implementation.

FIG. 3 illustrates the foregoing example implementations, as applied to the training phase at 300. As explained above, training images 301 are provided to the deep learning neural network 303, to generate image labels 305 associated with a zone classification of the location of the image. This is further represented as images at 313. The plurality of images 307 our correspondingly used for training at 309, and labeled at 311.

Figure 4:
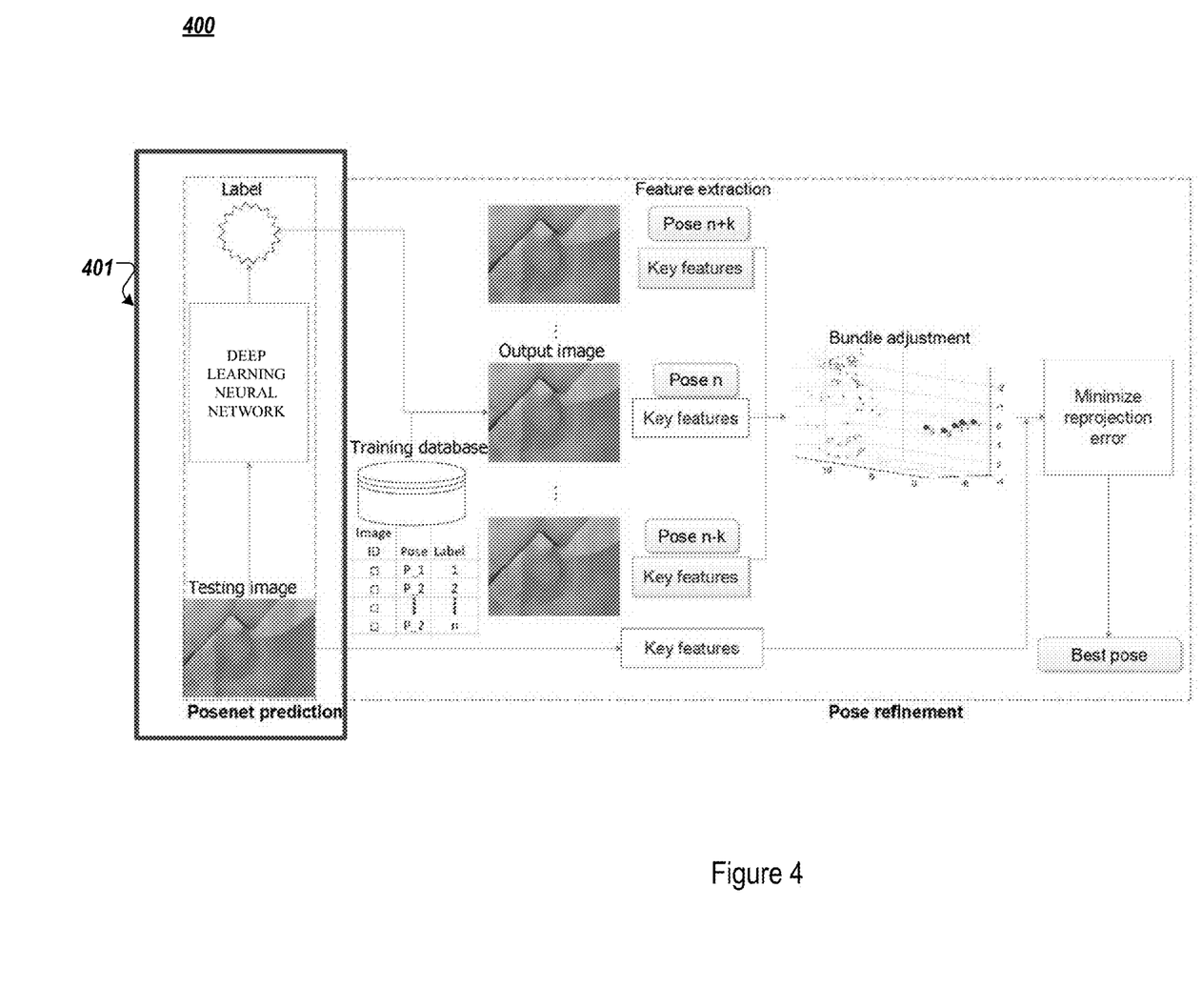
FIG. 4 illustrates training approaches according to an example implementation.

In the PoseNet 107, a testing image 111 is provided to the deep learning neural network 113, and a label 115 is generated. This is also represented in FIG. 4 as 401. More specifically, for a test image, the most similar zone in a training set is predicted with a deep neural network.

Figure 5:
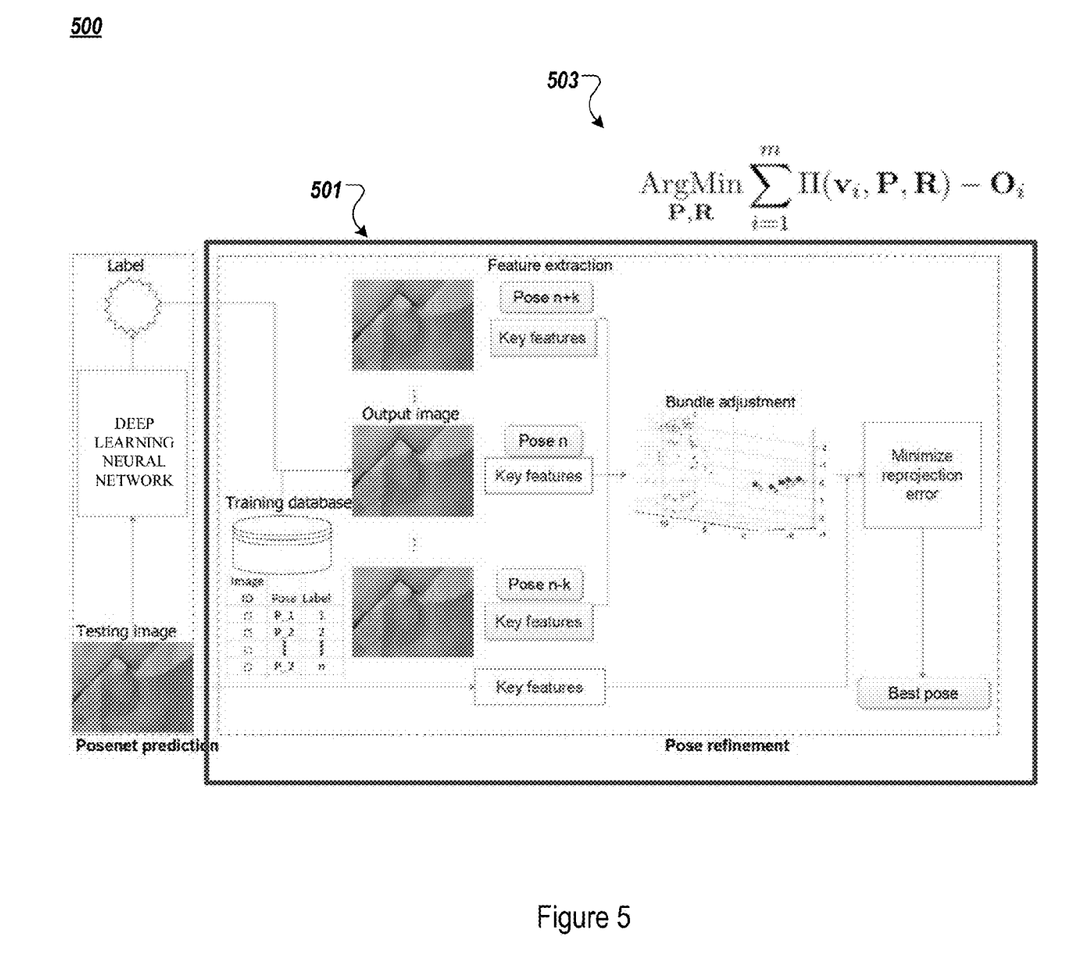
FIG. 5 illustrates prediction approaches according to an example implementation.

In the pose refinement at 109, a training database 117 receives inputs from the PoseNet 107. This is also represented in FIG. 5 as 501. For example, but not by way of limitation, the training database may provide an image ID, associated with a pose and a label. The pose is indicative of the image condition, and the label is indicative of the classification associated with the pose.

This information is fed to a feature extractor, which receives output images at 119, 121 and 123, associated with poses n−k 133, n 129 and n+k 125, respectively. For example but not by way of limitation, the zone as well as neighboring zones are included, so as to avoid potential misclassification risk prior to bundle adjustment and reprojection error minimization.

Accordingly, at 135, 131 and 127, features are extracted from each of the images 123, 121 and 119 respectively. More specifically, the feature extractor is employed to extract (e.g., SURF) from the stream of images. Those extracted features are further used for bundle adjustment, and the features from each image are registered based on their properties.

Figure 6:
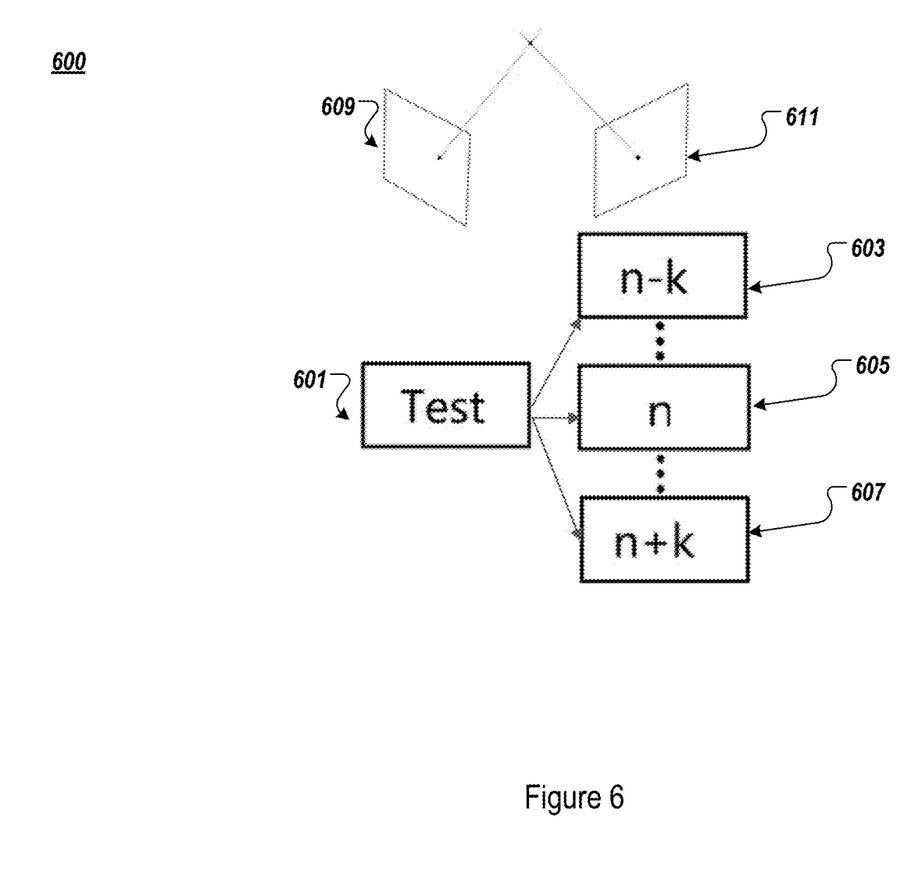
FIG. 6 illustrates bundle adjustment according to an example implementation.

More specifically, and as shown in FIG. 6, the feature extractor involves use of the output image 601, which is images 119, 121 and 123. The foregoing feature extraction operations are performed on the output image 601, for a plurality of neighboring poses n−k 603, n 605, and n+k 607, which may be indicative of various zones. As shown at 609 and 611, triangulation of the map points may be performed based on the predicted zone.

At 139, in bundle adjustment, the extracted features (e.g., 135, 131 and 127) from images 123, 121 and 119 and the pose information 133, 129 and 125, for those images are used to perform local bundle adjustment for mapping poses. Since the poses of the involved image are ground truth, it is a multiple image triangulation process to map several corner feature points.

At 141, and also represented in FIG. 5 as 503, the re-projection error as may be defined in Eq. (1) may be re-optimized.

P (position) and R (orientation) are the pose of the scope, and $v_i$ is the triangulated map points. $\Pi(\ )$ re-projects the 3D points into 2D image space, and $O_i$ is the registered 2D observation. At 137, the key features of the testing image 111 may also be fed into the reprojection error minimization of 141.

If the optimized averaged re-projection level is below or equal to a threshold, the optimal global pose is found at 143. Otherwise, the initial pose is assumed to be not correct and caused by the failure of the Posenet. Since the output of the Posenet is able to be fully measured, the example implementations provide a robust approach to identify the validity of the output.

Additionally, re-projection error is minimized. More specifically, a registration is built between the key features and the test image, which is further used for optimizing the pose of the test image by minimizing the re-projection error of the registered key feature points.

The foregoing example implementation may be implemented in various applications. For example, the scope may be used in a medical setting, to provide information associated with temp oral changes related to a feature. And one example application, growth of a polyp may be tracked over time, and by being able to determine the exact location of the scope, as well as the ability to properly identify the polyp and its size, the medical professional may have a more precise tracking of the polyp. As a result, the medical professional may be able to provide a more accurate risk analysis, as well as providing the associated recommendations and course of action and a more accurate manner.

Further, the scope may also include a device or tool to perform an action in the environment of human body. For example, the scope may include a tool that can modify a target within the environment. In one example implementation, the tool may be a cutting tool, such as a laser or heat or a blade, or other cutting structures as understood by those skilled in the art. The cutting tool may perform an action, such as cutting a polyp in real time if the polyp is larger than a certain size.

Depending on a medical approach, as a rule, or only cut the polyp when it is determined by the medical professional to be too large or to be harmful to the patient; according to more conservative approaches, growth of the target in the environment may be tracked. Additionally, the scope may be used in accordance with the example implementations to more accurately perform follow-up screening after an action taken by a device or a tool.

While the example of a polyp is shown herein, the present example implementations are not limited thereto, and other environments or targets may be substituted therefor about departing from the inventive scope. For example but not by way of limitation, the environment may be the bronchial tubes of the lungs instead of the GI tract. Similarly, the target may be a lesion or a tumor instead of a polyp.

Additionally, the example practical implementations may feed results into a predictive tool. According to such an example approach, based on demographics, growth rate of the tissue and historical data, and analysis may be performed to generate a predictive risk assessment. The predictive risk assessment may be reviewed by a medical professional, and the medical professional may verify or validate result of the predictive tool. The validation or verification by the medical professional may be fed back into the predictive tool to improve its accuracy. Alternatively, the predictive risk assessment may be input into a decision support system, with or without the verification or validation by the medical professional.

In such a circumstance, the decision support system may provide a recommendation to the medical professional, either in real time in after the scope has been removed. In the option where the recommendation is provided to the medical professional in real time, because the scope may also carry the cutting tool, a real-time operation may be performed based on a recommendation of the decision support system.

Additionally, while the foregoing example implementations may define the environment as an environment within the human body not having well-defined corner points, such as the lungs or intestines, the example implementations are not limited thereto, and other environments having similar features may also be within the present scope.

For example but not by way of limitation, piping systems, such as sewer pipes or water pipes, may be difficult to inspect for damage, wear and tear or replacement, due to a difficulty in being able to determine in exactly which pipe segment the inspection tool is located. By employing the present example implementations, sewer pipes and water pipes may be more accurately inspected over time, and pipe maintenance, replacement or the like may be performed with less accuracy issue. Similar approaches may be taken in industrial safety, such as in factory environments minds, underwater, subterranean environments such as caves, or other similar environments that meet the conditions associated with the present example implementations.

Figure 7:
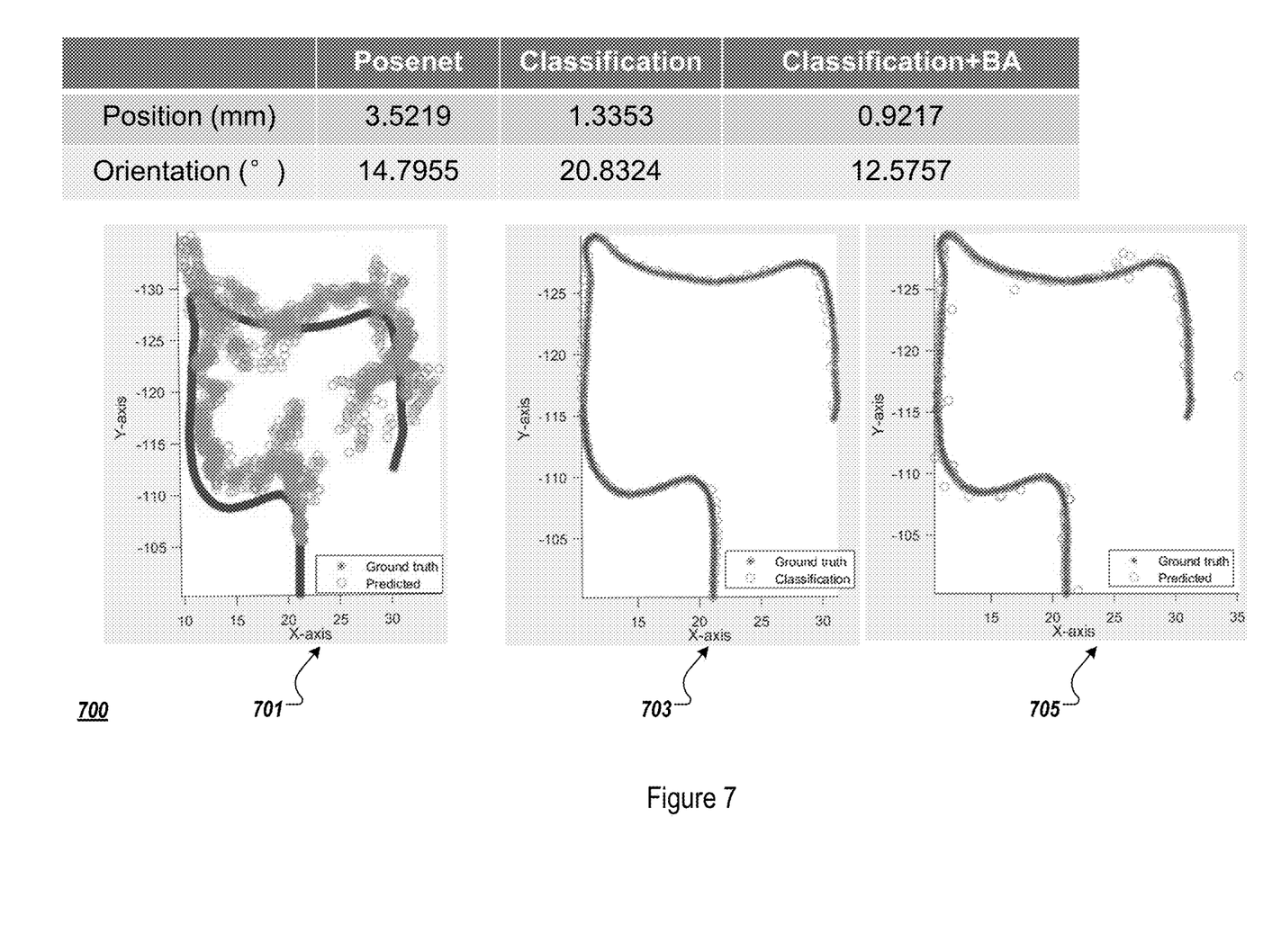
FIG. 7 illustrates results according to example implementations.

FIG. 7 illustrates at 700 results associated with the example implementations. At 701, related art approaches are shown that only include deep learning. More specifically, the approaches that employ regression are shown, and as can be seen, the number of outliers outside of ground truth is significant both in magnitude and number. As explained above, this is due to the related art problem of small field of view of the camera, and the associated risk of misclassification.

At 703, approaches that employ test image information using only classification are shown. However, according to this approach, data is limited to the data that is available strictly from the video.

At 705, approaches according to the example implementations are shown, including classification as well as bundle adjustment. Although there are a small number of errors, those errors are primarily due to image texture.

Figure 8:
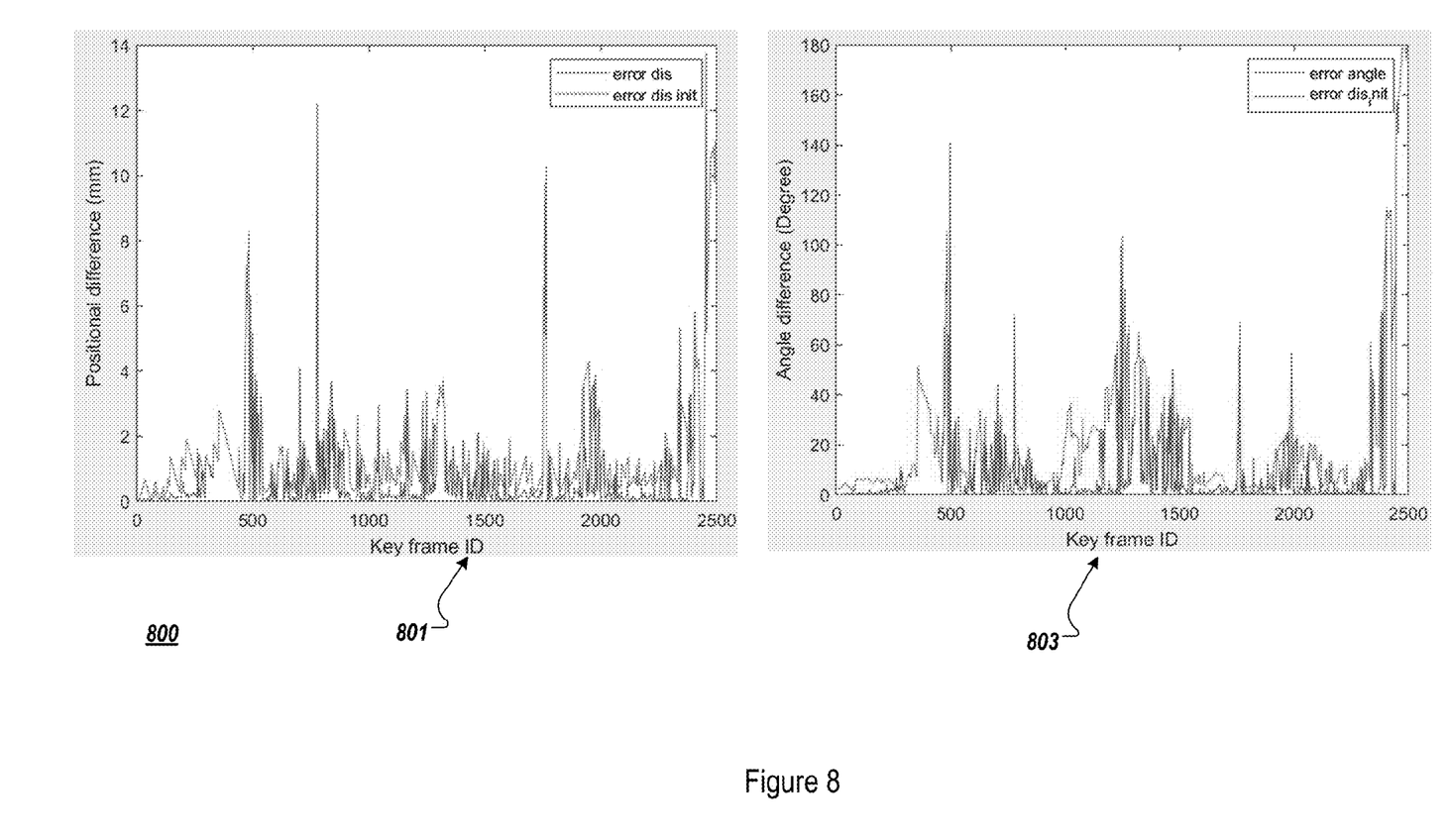
FIG. 8 illustrates results according to example implementations.

FIG. 8 illustrates a validation of the example implementations, showing the difference in the error over time. The X-axis illustrates the keyframes over time, and the Y-axis illustrates the error. At 801, the error in position is represented, and at 803, the error in angle is represented. The blue line represents the error using the technique of the example implementations, and the red line represents the error calculated using classification technique only, and corresponding to 703 as described above and shown in FIG. 7.

More specifically, a simulation dataset is generated based on the off-the-shelf model of a male's digestive system. A virtual colonoscope is placed inside the colon, and the observation is simulated. Unity3D (https://unity.com/) is used to simulate and generate the sequential 2D RGB images with a strict pin-hole camera model. The frame rate and size of the simulated in-vivo digestive (e.g., as shown in FIG. 2) is 30 frames per second and 640 480. Simultaneously, the global pose of the colonoscope is recorded.

As illustrated, and as explained above, the red plot is directed to the results with classification only (e.g., related art), and the blue plot is directed to the results, for which the pose refinement according to the example implementations has been performed. As can be seen, generally speaking the results show better accuracy for the pose refinement having been performed, both with respect to positional difference and angle difference.

More specifically, and as explained above, FIG. 8 illustrates a comparison 800 of positional difference error with respect to key frame ID at 801, and a comparison of angle difference error to key frame ID at 803. Table 1 shows the error comparison between the related art (i.e., Contextual-Net) and the example implementations described herein.

Table 1

The example implementations may be integrated with other sensors or approaches. For example but not by way of limitation, other sensors may be integrated on the scope, such as an inertial measurement unit, temperature sensor, acidity sensor, or other sensors associated with sensing a perimeter associated with an environment.

Similarly, multiple sensors of a given type of sensor may be employed; related art approaches may not employ such multiple sensors; the related art focuses on providing an exact position, as opposed to using the labeling, feature extraction, bundle adjustment and reprojection error minimization approach described herein.

Because the present example implementations do not require a higher degree of sensor or camera accuracy, or additional training data sets, existing equipment may be used with the example implementations to achieve more accurate results. Accordingly, the need to upgrade hardware in order to obtain more accurate cameras or sensors may be reduced.

Further, the increased accuracy may also permit cameras and scopes of different types to be interchanged, and for different medical facilities to more easily exchange results and data, and to involve more and different medical professionals, without sacrificing accuracy, and the ability to properly analyze and make recommendations, and take actions.

Figure 9:
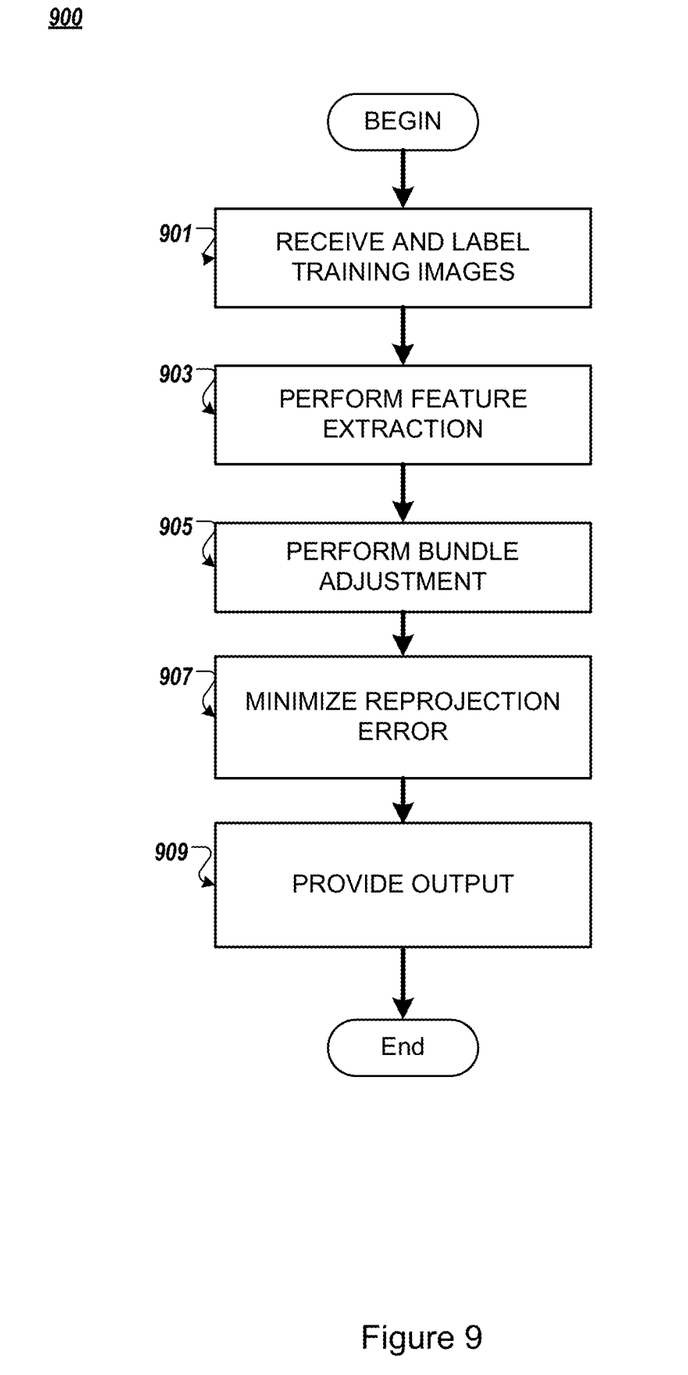
FIG. 9 illustrates an example process for some example implementations.

FIG. 9 illustrates an example process 900 according to the example implementations. The example process 900 may be performed on one or more devices, as explained herein.

At 901, the neural network receives inputs and labels training images. For example but not by way of limitation, as explained above, the training images may be generated from simulation. Alternatively, historical data associated with one or more patients may be provided. The training data is used in a model, and pose regression is substituted with zone classification. For example, but not by way of limitation, images in neighboring poses may be classified as zones.

At 903, feature extraction is performed. More specifically, the image is provided to a training database 117. Based on the key features, a classification determination is provided as to whether the feature of the image can be classified as being in a particular pose.

At 905, an adjustment is performed. More specifically, a predicted zone is used to triangulate map points, as explained above.

At 907, an operation is performed to minimize reprojection error of map points on the test image, by adjusting the pose. Based on the results of this operation, and optimal pose is determined.

At 909, an output is provided. For example, but not by way of limitation, the output may be an indication of a zone or a location within a zone of the image, or a scope associated with the image. Accordingly, a medical professional may be assisted in determining a location of an image in a target tissue such as in the GI tract, lungs or other tissue.

Figure 10:
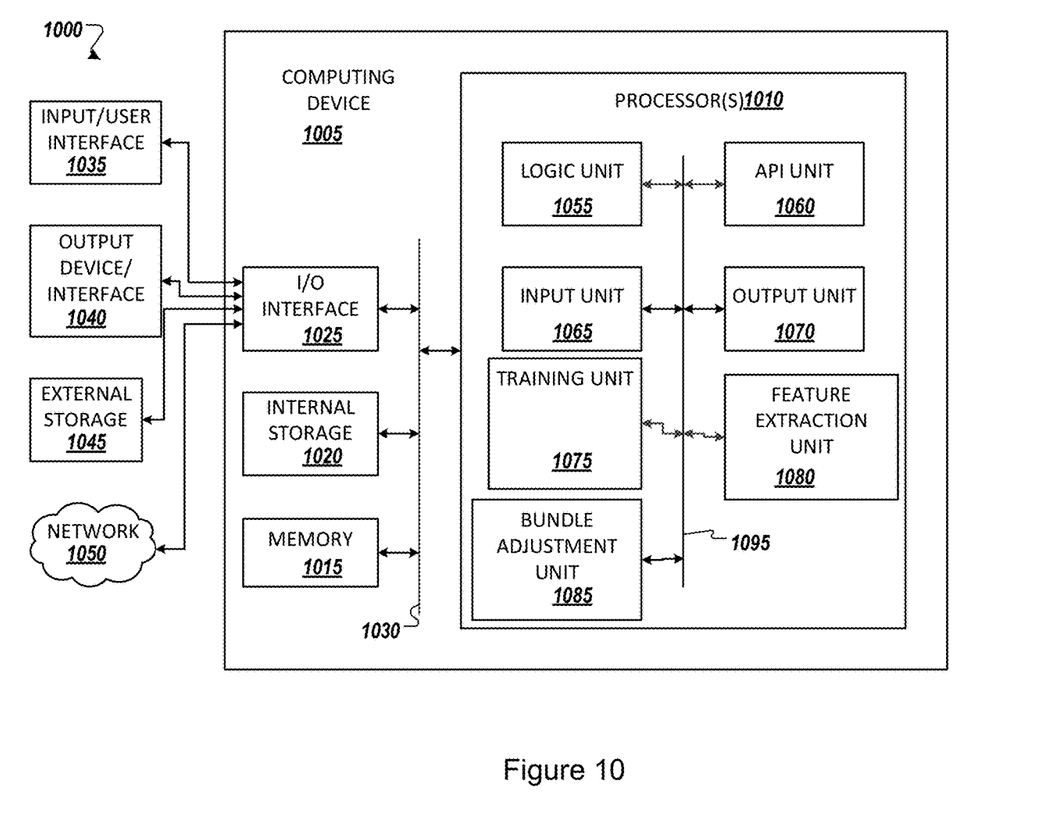
FIG. 10 illustrates an example computing environment with an example computer device suitable for use in some example implementations.

FIG. 10 illustrates an example computing environment 1000 with an example computer device 1005 suitable for use in some example implementations. Computing device 1005 in computing environment 1000 can include one or more processing units, cores, or processors 1010, memory 1015 (e.g., RAM, ROM, and/or the like), internal storage 1020 (e.g., magnetic, optical, solid state storage, and/or organic), and/or I/O interface 1025, any of which can be coupled on a communication mechanism or bus 1030 for communicating information or embedded in the computing device 1005.

According to the present example implementations, the processing associated with the neural activity may occur on a processor 1010 that is the central processing unit (CPU). Alternatively, other processors may be substituted therefor without departing from the inventive concept. For example, but not by way of limitation, a graphics processing unit (GPU), and/or a neural processing unit (NPU) may be substituted for or used in combination with the CPU to perform the processing for the foregoing example implementations.

Computing device 1005 can be communicatively coupled to input/interface 1035 and output device/interface 1040. Either one or both of input/interface 1035 and output device/interface 1040 can be a wired or wireless interface and can be detachable. Input/interface 1035 may include any device, component, sensor, or interface, physical or virtual, which can be used to provide input (e.g., buttons, touch-screen interface, keyboard, a pointing/cursor control, microphone, camera, braille, motion sensor, optical reader, and/or the like).

Output device/interface 1040 may include a display, television, monitor, printer, speaker, braille, or the like. In some example implementations, input/interface 1035 (e.g., user interface) and output device/interface 1040 can be embedded with, or physically coupled to, the computing device 1005. In other example implementations, other computing devices may function as, or provide the functions of, an input/interface 1035 and output device/interface 1040 for a computing device 1005.

Examples of computing device 1005 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like).

Computing device 1005 can be communicatively coupled (e.g., via I/O interface 1025) to external storage 1045 and network 1050 for communicating with any number of networked components, devices, and systems, including one or more computing devices of the same or different configuration. Computing device 1005 or any connected computing device can be functioning as, providing services of, or referred to as, a server, client, thin server, general machine, special-purpose machine, or another label. For example but not by way of limitation, network 1050 may include the blockchain network, and/or the cloud.

I/O interface 1025 can include, but is not limited to, wired and/or wireless interfaces using any communication or I/O protocols or standards (e.g., Ethernet, 802.11 xs, Universal System Bus, WiMAX, modem, a cellular network protocol, and the like) for communicating information to and/or from at least all the connected components, devices, and network in computing environment 1000. Network 1050 can be any network or combination of networks (e.g., the Internet, local area network, wide area network, a telephonic network, a cellular network, satellite network, and the like).

Computing device 1005 can use and/or communicate using computer-usable or computer-readable media, including transitory media and non-transitory media. Transitory media includes transmission media (e.g., metal cables, fiber optics), signals, carrier waves, and the like. Non-transitory media includes magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 1005 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1010 can execute under any operating system (OS) (not shown), in a native or virtual environment. One or more applications can be deployed that include logic unit 1055, application programming interface (API) unit 1060, input unit 1065, output unit 1070, training unit 1075, feature extraction unit 1080, bundle adjustment unit 1085, and inter-unit communication mechanism 1095 for the different units to communicate with each other, with the OS, and with other applications (not shown).

For example, the training unit 1075, the feature extraction unit 1080, and the bundle adjustment unit 1085 may implement one or more processes shown above with respect to the structures described above. The described units and elements can be varied in design, function, configuration, or implementation and are not limited to the descriptions provided.

In some example implementations, when information or an execution instruction is received by API unit 1060, it may be communicated to one or more other units (e.g., logic unit 1055, input unit 1065, training unit 1075, feature extraction unit 1080, and bundle adjustment unit 1085).

For example, the training unit 1075 may receive and process information, from simulated data, historical data, or one or more sensors, as explained above. An output of the training unit 1075 is provided to the feature extraction unit 1080, which performs the necessary operations based on the application of the neural networks as described above and illustrated in FIGS. 1-5, for example. Additionally, the bundle adjustment unit 1085 may perform operations and minimize reprojection error to provide an output signal, based on the outputs of the training unit 1075 and the feature extraction unit 1080.

In some instances, the logic unit 1055 may be configured to control the information flow among the units and direct the services provided by API unit 1060, input unit 1065, training unit 1075, feature extraction unit 1080, and bundle adjustment unit 1085 in some example implementations described above. For example, the flow of one or more processes or implementations may be controlled by logic unit 1055 alone or in conjunction with API unit 1060.

Figure 11:
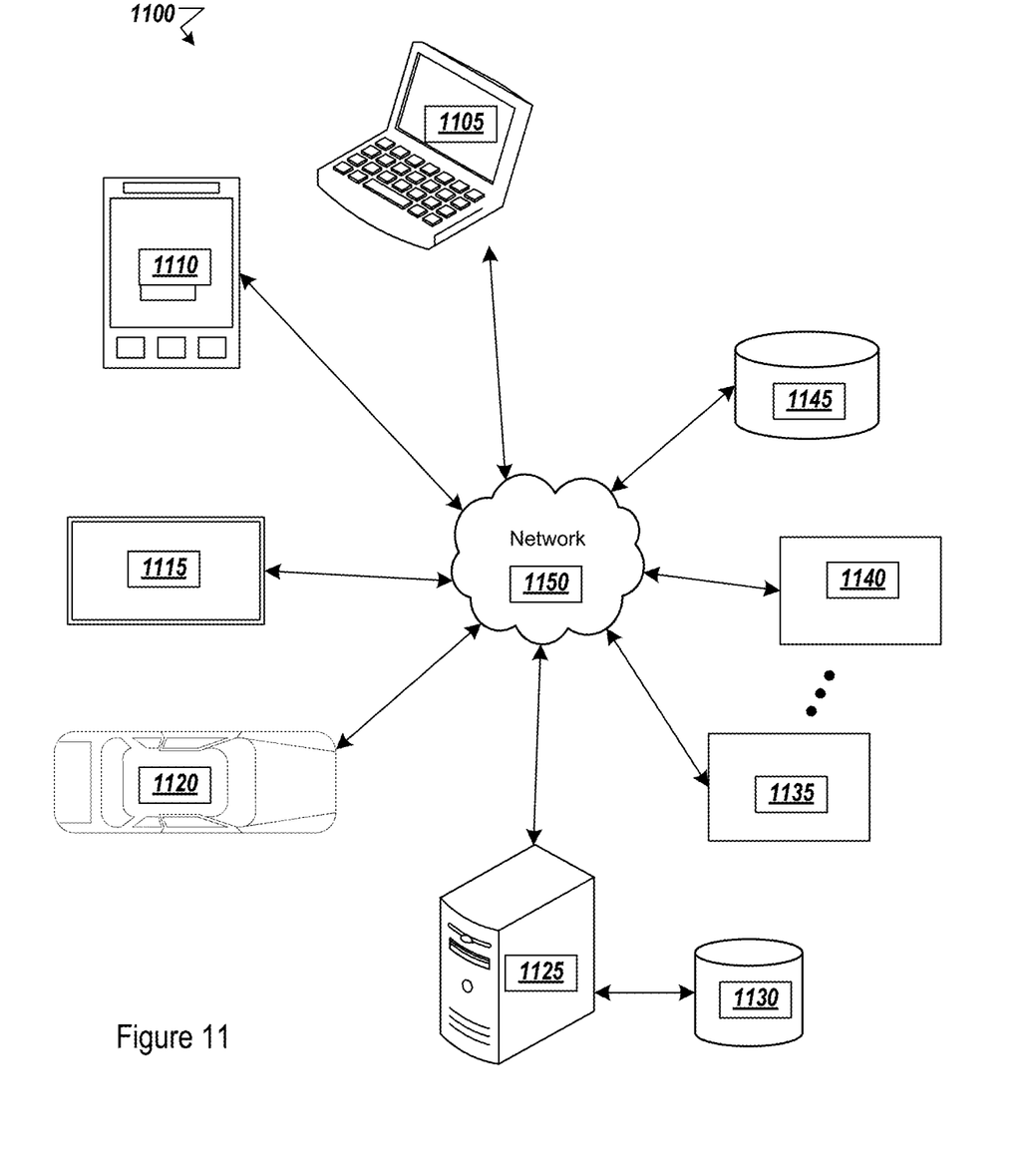
FIG. 11 shows an example environment suitable for some example implementations.

FIG. 11 shows an example environment suitable for some example implementations. Environment 1100 includes devices 1105-1145, and each is communicatively connected to at least one other device via, for example, network 1160 (e.g., by wired and/or wireless connections). Some devices may be communicatively connected to one or more storage devices 1130 and 1145.

An example of one or more devices 1105-1145 may be computing devices 1005 described in FIG. 10, respectively. Devices 1105-1145 may include, but are not limited to, a computer 1105 (e.g., a laptop computing device) having a monitor and an associated webcam as explained above, a mobile device 1110 (e.g., smartphone or tablet), a television 1115, a device associated with a vehicle 1120, a server computer 1125, computing devices 1135-1140, storage devices 1130 and 1145.

In some implementations, devices 1105-1120 may be considered user devices associated with the users, who may be remotely obtaining a sensed input used as inputs for the foregoing example implementations. In the present example implementations, one or more of these user devices 1105-1120 may be associated with one or more sensors such as cameras embedded in a user's body, remote from the patient care facility, temporarily or permanently, that can sense information as needed for the present example implementations, as explained above.

While the foregoing example implementations are provided to be indicative of an inventive scope, they are not intended to be limiting, and other approaches or implementations may be substituted or added without departing from the inventive scope. For example, but not by way of limitation, image techniques other than the ones disclosed herein may be employed.

According to one example implementation, an algorithm such as SuperPoint may be used for training image point detection and determination. Further, the example implementation may employ alternative image classification algorithms, and/or use other neural network structures (e.g., Siamese network). Additional approaches a integrate expert knowledge in zone class action, apply enhancement two images by use of techniques such as the formation, lighting and illumination, and/or use a single image to depth method.

The example implementations may have various advantages and benefits, although this is not required. For example, but not by way of limitation, the example implementations are workable on a small data set. Further, the example implementations provide for a constraining of location inside the target tissue, such as the colon or lungs. Thus, a surgeon may be able to more accurately localize a position of a scope anybody by use of video. Further, the example implementations provide a much higher accuracy than related art approaches.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

What is claimed is:

1. A computer-implemented method, comprising:
applying training images of an environment divided into zones to a neural network, and performing classification to label a test image based on a closest zone of the zones;
extracting a feature from retrieved training images and pose information of the test image that match the closest zone;
performing bundle adjustment on the extracted feature by triangulating map points for the closest zone to generate a reprojection error, and minimizing the reprojection error to determine an optimal pose of the test image; and
for the optimal pose, providing an output indicative of a location or probability of a location of the test image at the optimal pose within the environment.

2. A computer-implemented method of claim 1, wherein the applying the training images comprises receiving the training images associated with poses in zones of the environment as historical or simulation data, and providing the received training images to a neural network.

3. A computer-implemented method of claim 2, wherein the neural network is a deep learning neural network that learns zones associated with the pose, and determines the closest zone for the test image.

4. A computer-implemented method of claim 1, wherein the bundle adjustment comprises reprojecting the 3D points associated with a measured pose and the triangulated map points into 2D image space to generate a result, and comparing the result to a registered 2D observation to determine the reprojection error.

5. A computer-implemented method of claim 4, wherein for reprojection error being below or equal to a threshold, the pose of the test image is confirmed to be the optimal pose.

6. A computer-implemented method of claim 4, wherein for reprojection error being above a threshold, the pose of the test image is determined to be not correct and a calculation of the pose of the test image is determined to be correct.

7. A computer-implemented method of claim 1, wherein the minimizing the reprojection error comprises adjusting the pose of the test image to minimize the reprojection error.

8. A non-transitory computer readable medium having a storage that stores instructions, the instructions executed by a processor, the instructions comprising:
applying training images of an environment divided into zones to a neural network, and performing classification to label a test image based on a closest zone of the zones;
extracting a feature from retrieved training images and pose information of the test image that match the closest zone;
performing bundle adjustment on the extracted feature by triangulating map points for the closest zone to generate a reprojection error, and minimizing the reprojection error to determine an optimal pose of the test image; and
for the optimal pose, providing an output indicative of a location or probability of a location of the test image at the optimal pose within the environment.

9. A non-transitory computer readable medium of claim 8, wherein the applying the training images comprises receiving the training images associated with poses in zones of the environment as historical or simulation data, and providing the received training images to a neural network.

10. A non-transitory computer readable medium of claim 9, wherein the neural network is a deep learning neural network that learns zones associated with the pose, and determines the closest zone for the test image.

11. A non-transitory computer readable medium of claim 8, wherein the bundle adjustment comprises reprojecting the 3D points associated with a measured pose and the triangulated map points into 2D image space to generate a result, and comparing the result to a registered 2D observation to determine the reprojection error.

12. A non-transitory computer readable medium of claim 11, wherein for reprojection error being below or equal to a threshold, the pose of the test image is confirmed to be the optimal pose.

13. A non-transitory computer readable medium of claim 11, wherein for reprojection error being above a threshold, the pose of the test image is determined to be not correct and a calculation of the pose of the test image is determined to be correct.

14. A non-transitory computer readable medium of claim 8, wherein the minimizing the reprojection error comprises adjusting the pose of the test image to minimize the reprojection error.

15. A computer-implemented system for localizing and tracking a scope in an environment to identify a target, comprising:
a memory configured to store a program; and
a processor communicatively coupled to the memory and configured to execute the program to:
apply training images of the environment that is associated with the scope, divided into zones to a neural network, and performing classification to label a test image, generated by the scope, based on a closest zone of the zones of the environment associated with the scope;
extract a feature from retrieved training images and pose information of the test image that match the closest zone;
perform bundle adjustment on the extracted feature by triangulating map points for the closest zone to generate a reprojection error, and minimizing the reprojection error to determine an optimal pose of the test image; and
for the optimal pose, provide an output indicative of a location or probability of a location of the test image generated by the scope, at the optimal pose within the environment.

16. The computer-implemented system of claim 15, wherein the environment comprises a gastrointestinal tract, or a bronche tract of one or more lungs.

17. The computer-implemented system of claim 15, further comprising the scope, wherein the scope is configured to provide a location of one or more targets that comprise at least one of a polyp, a lesion and a cancerous tissue.

18. The computer-implemented system of claim 15, further comprising the scope, wherein the scope comprises one or more sensors configured to receive the test image associated with the environment, and the test image is a visual image.

19. The computer-implemented system of claim 15, further comprising the scope, wherein the scope is an endoscope or a bronchoscope.

20. The computer-implemented system of claim 15, wherein the environment is a piping system, a subterranean environment, or an industrial facility.

* * * * *